US008578344B2

(12) United States Patent
Godefroid et al.

(10) Patent No.: US 8,578,344 B2
(45) Date of Patent: Nov. 5, 2013

(54) INCREMENTAL COMPOSITIONAL DYNAMIC TEST GENERATION

(75) Inventors: Patrice Godefroid, Mercer Island, WA (US); Shuvendu Kumar Lahiri, Redmond, WA (US); Cindy Rubio-Gonzalez, Madison, WI (US)

(73) Assignee: Microsoft Corporation, Redmond, WA (US)

( * ) Notice: Subject to any disclaimer, the term of this patent is extended or adjusted under 35 U.S.C. 154(b) by 557 days.

(21) Appl. No.: 12/817,291

(22) Filed: Jun. 17, 2010

(65) Prior Publication Data

US 2011/0314454 A1 Dec. 22, 2011

(51) Int. Cl.
*G06F 9/44* (2006.01)
(52) U.S. Cl.
USPC .......................... 717/131; 717/122; 717/124
(58) Field of Classification Search
USPC .................................................. 717/122, 131
See application file for complete search history.

(56) References Cited

U.S. PATENT DOCUMENTS

| 2006/0168565 A1* | 7/2006 | Gamma et al. ............... 717/122 |
| 2007/0033440 A1 | 2/2007 | Tillmann et al. |
| 2007/0033576 A1 | 2/2007 | Tillmann et al. |
| 2007/0162894 A1 | 7/2007 | Noller et al. |
| 2007/0288899 A1 | 12/2007 | Fanning et al. |
| 2009/0281999 A1 | 11/2009 | Sinha |
| 2009/0282289 A1 | 11/2009 | Nori et al. |

OTHER PUBLICATIONS

Bouillaguet et al., "Using First-Order Theorem Provers in the Jahob Data Structure Verification System," 2007, pp. 74-88.*
Artzi, et al., "Finding Bugs in Dynamic Web Applications", International Symposium on Software Testing and Analysis, Proceedings of the 2008 international symposium on Software testing and analysis, Jul. 20-24, 2008, pp. 11.
Boonstoppel, et al., "RWset: Attacking Path Explosion in Constraint-Based Test Generation", Tools and Algorithms for the Construction and Analysis of Systems, 14th International Conference, TACAS, Held as Part of the Joint European Conferences on Theory and Practice of Software, ETAPS, Mar. 29-Apr. 6, 2008, pp. 16.
Wang, et al., "Static Analysis Approach for Automatic Generating Test Cases for Web Applications", CSSE, Proceedings of the 2008 International Conference on Computer Science and Software Engineering, vol. 2, Dec. 12-14, 2008, pp. 751-754.
Majumdar, et al., "LATEST : Lazy Dynamic Test Input Generation", Technical Report, No. UCB/EECS-2007-36, Mar. 20, 2007, pp. 12.

(Continued)

*Primary Examiner* — Li B Zhen
*Assistant Examiner* — Lenin Paulino
(74) *Attorney, Agent, or Firm* — Hope Baldauff, LLC

(57) ABSTRACT

Concepts and technologies are described herein for incremental compositional dynamic test generation. The concepts and technologies described herein are used to increase the code coverage and security vulnerability identification abilities of testing applications and devices, without significantly increasing, and in some cases decreasing, computational and time costs associated with the testing. Test summaries that describe how code is tested by a test engine are generated and stored during testing of code. These test summaries can be evaluated when additional iterations or versions of the code are tested. If functions corresponding to the test summaries are unchanged from, or logically equivalent to, a version of the function previously tested, the test summary may be used when testing the new version of the code.

12 Claims, 6 Drawing Sheets

(56) References Cited

OTHER PUBLICATIONS

Anand, et al., "Demand-Driven Compositional Symbolic Execution", Tools and Algorithms for the Construction and Analysis of Systems, 14th International Conference, TACAS, Held as Part of the Joint European Conferences on Theory and Practice of Software, ETAPS, Mar. 29-Apr. 6, 2008, pp. 19.
Barnett, et al., "Weakest-precondition of unstructured programs", Workshop on Program Analysis for Software Tools and Engineering, Proceedings of the 6th ACM SIGPLAN-SIGSOFT, Sep. 5-6, 2005, pp. 1-8.
Bush, et al., "A static analyzer for finding dynamic programming errors", Software—Practice & Experience, vol. 30, No. 7, Jun. 2000, pp. 775-802.
Cadar, et al., "EXE: Automatically Generating Inputs of Death", Conference on Computer and Communications Security, Proceedings of the 13th ACM conference on Computer and communications security, Oct. 30-Nov. 3, 2006, pp. 14.
Chandra, et al., "Snugglebug: A Powerful Approach to Weakest Preconditions", ACM SIGPLAN Notices, PLDI '09, vol. 44, No. 6, Jun. 2009, pp. 12.
Conway, et al., "Incremental algorithms for inter-procedural analysis of safety properties", Computer Aided Verification, 17th International Conference, CAV, Jul. 6-10, 2005, pp. 1-18.
DAS< et al., "ESP: Path-Sensitive Program Verification in Polynomial Time", Conference on Programming Language Design and Implementation, Proceedings of the ACM SIGPLAN 2002 Conference on Programming language design and implementation, Jun. 17-19, 2002, pp. 12.
Moura, et al., "Z3: An Efficient SMT Solver", Tools and Algorithms for the Construction and Analysis of Systems, 14th International Conference, TACAS, Held as Part of the Joint European Conferences on Theory and Practice of Software, ETAPS, Mar. 29-Apr. 6, 2008, pp. 16.
Deline, et al., "BoogiePL: A typed procedural language for checking object-oriented programs", Technical Report, MSR-TR-2005-70, May 27, 2005, pp. 13.
Srivastava, et al., "Vulcan: Binary transformation in a distributed environment", Technical Report, MSR-TR-2001-50, Apr. 20, 2001, pp. 1-12.
Godefroid, Patrice., "Compositional Dynamic Test Generation", Annual Symposium on Principles of Programming Languages, Proceedings of the 34th annual ACM SIGPLAN-SIGACT symposium on Principles of programming languages, Jan. 17-19, 2007, pp. 12.
Godefroid, Patrice., "Software Model Checking Improving Security of a Billion Computers", Model Checking Software, 16th International SPIN Workshop, Jun. 26-28, 2009, pp. 1-44.
Godefroid, et al., "Abstraction based Model Checking using Modal Transition Systems", Lecture Notes In Computer Science, Proceedings of the 12th International Conference on Concurrency Theory, vol. 2154, Aug. 20-25, 2001, pp. 15.
Godefroid, et al., "DART: Directed Automated Random Testing", ACM SIGPLAN Notices, Proceedings of the 2005 ACM SIGPLAN conference on Programming language design and implementation, vol. 40, No. 6, Jun. 12-15, 2005, pp. 11.
Godefroid, et al., "Automated Whitebox Fuzz Testing", Technical Report, MS-TR-2007-58, May 2007, pp. 16.
Godefroid, et al., "Compositional May-Must Program Analysis: Unleashing the Power of Alternation", Annual Symposium on Principles of Programming Languages, Proceedings of the 37th annual ACM SIGPLAN-SIGACT symposium on Principles of programming languages, Jan. 17-23, 2010, pp. 1-12.
Graves, et al., "An Empirical Study of Regression Test Selection techniques", ACM Transactions on Software Engineering and Methodology (TOSEM), vol. 10, No. 2, Apr. 2001, pp. 1-17.
Gurfinkel, et al., "Yasm: A Software Model Checker for Verification and refutation", In Proceedings of 18th International Conference on Computer Aided Verification (CAV'06), vol. 4144 of LNCS, Aug. 2006, pp. 1-4.
Hallem, et al., "A System and Language for Building System-Specific Static Analyses", Conference on Programming Language Design and Implementation, Proceedings of the ACM SIGPLAN 2002 Conference on Programming language design and implementation, Jun. 17-19, 2002, pp. 14.
Hoenicke, et al., "It's doomed; we can prove it", Lecture Notes In Computer Science, Proceedings of the 2nd World Congress on Formal Methods, vol. 5850, Nov. 2-6, 2009, pp. 1-16.
McCarthy, J., "Towards a mathematical science of computation", May 14, 1996, pp. 1-25.
Molnar, et al., "Dynamic test generation to find integer bugs in x86 binary linux programs", In Proceedings of 18th USENIX Security Symposium on USENIX Security Symposium, 2009, pp. 1-24.
Reps, et al., "Precise Interprocedural Dataflow Analysis via Graph Reachability", Annual Symposium on Principles of Programming Languages, Proceedings of the 22nd ACM SIGPLAN-SIGACT symposium on Principles of programming languages, Jan. 23-25, 1995, pp. 1-13.
Godefroid, et al., "Incremental Compositional Dynamic Test Generation", MSR-TR-2010-11, Feb. 2010, pp. 12.

* cited by examiner

INCREMENTAL COMPOSITIONAL DYNAMIC TEST GENERATION

BACKGROUND

Whitebox fuzzing is a form of security testing of application code based upon dynamic test generation. During testing, the application code is executed symbolically to gather constraints on code inputs from conditional statements encountered during execution of the application code. These constraints are systematically solved using a constraint solver to generate new test inputs for exercising different execution paths of the program. One goal of whitebox fuzzing is to test as many execution paths of the application code as is possible, thereby increasing the likelihood that security vulnerabilities will be identified.

The use of whitebox fuzzing has been expanded from merely testing units of application code to testing entire programs or applications, which may have billions of instructions and/or execution paths. Thus, executing every possible execution path of the application code may be costly in terms of time and/or computational resources. With increased computational power demands and increased load on the whitebox fuzzers, the rate at which programs can be checked for security vulnerabilities such as buffer overflow errors and the like decreases. Thus, while whitebox fuzzing is resulting in increased success in program code analysis, significant challenges remain such as increasing code coverage and security vulnerability finding, while avoiding large increases, or even reducing, the computational and time costs usually associated with such an increase.

It is with respect to these and other considerations that the disclosure made herein is presented.

SUMMARY

Concepts and technologies are described herein for incremental compositional dynamic test generation. The concepts and technologies described herein are used to increase the code coverage and security vulnerability identification abilities of testing applications and devices, without significantly increasing, and in some cases decreasing, computational and time costs associated with the testing.

Test summaries that describe how functions in code are tested by a test engine are generated and stored during testing of code. These test summaries can be used when testing functions to avoid having to compute constraints and/or test inputs for the functions to which the test summaries relate.

When the test application receives code containing a function for which a test summary exists, the test application can determine if the test summary is valid for the function in the code. For example, if the code is a new version of a previously tested version of the code, the test application can determine if the function corresponding to the test summary has been modified, or if the function corresponding to the test summary generates one or more calls to other functions that have been modified since the previous version of the code was tested. If the function has been modified, or if the function calls a modified function, the test summary can be treated as potentially invalid, and a second phase of analysis can be conducted on the function to determine whether to validate the test summary. If the function has not been modified, and if the function does not call a modified function, the test summary can be treated as valid, and may be used to test the new version of the code.

In the second phase of the analysis, the function corresponding to the potentially invalid test summary is analyzed, and the test application generates a logic formula that describes the behavior of the function. The logic formula is compared to the behavior of the test summary to determine if the behavior of the logic formula and the test summary are logically equivalent. If the behavior of the logic formula and the test summary are logically equivalent, the test application can treat the test summary corresponding to the function as valid, and the test summary may be used to test the new version of the code. If the behavior of the logic formula and the test summary are not logically equivalent, the test application can treat the test summary corresponding to the function as invalid, the function can be tested, and a new test summary corresponding to the function can be generated and stored.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
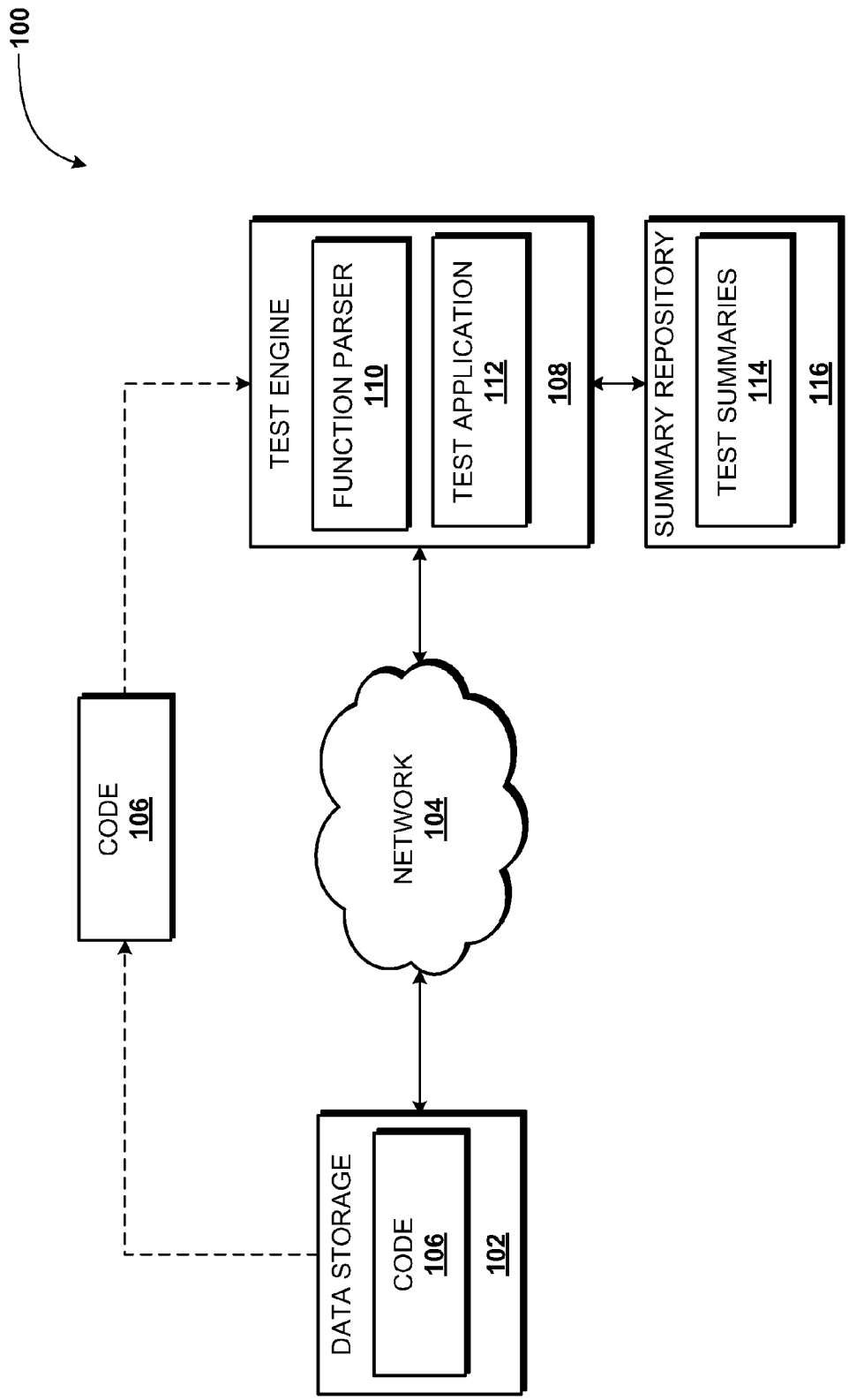
FIG. 1 is a system diagram illustrating an exemplary operating environment for the various embodiments disclosed herein.

The following detailed description is directed to concepts and technologies for incremental compositional dynamic test generation. According to the concepts and technologies described herein, code is analyzed and functions in the code are identified. During testing of function, one or more test summaries describing how the function is tested by a test engine are generated and stored at a data storage device. If another version or iteration of the function, or code containing the function, is received, the test summaries may be used during the testing. Thus, a device testing the new version of the function or code containing the function may not need to compute constraints and/or test inputs for the functions to which the test summaries relate.

When code containing a function for which a test summary exists is received, a test application can determine if the test summary is valid for the function in the code. For example, if the code is a new version of a previously tested version of the code, the test application can determine if the function corresponding to the test summary has been modified, or if the function corresponding to the test summary generates one or more calls to other functions that have been modified since the previous version of the code was tested and the test summaries were generated. If the function has been modified, or if the function calls a modified function, the test summary can be treated as potentially invalid and a second phase of analysis can be conducted on the function to determine whether to validate the test summary. If the function has not been modified since the test summary was generated, and if the function does not call a function since the test summary was generated, the test summary can be treated as valid. A valid test summary may be used to test the new version of the code.

For potentially invalid test summaries, the test application can provide a second phase of analysis to determine whether to validate the test summary or to confirm the test summary as invalid for use in testing the updated version of the code. In the second phase of the analysis, the function corresponding to the potentially invalid test summary is analyzed, and the test application generates a logic formula that describes the behavior of the function. The logic formula is compared to the behavior of the test summary to determine if the behavior of the logic formula and the test summary are logically equivalent. If the behavior of the logic formula and the test summary are logically equivalent, the test application can treat the test summary corresponding to the function as valid, and the test summary may be used to test the new version of the code. If the behavior of the logic formula and the test summary are not logically equivalent, the test application can treat the test summary corresponding to the function as invalid, the function can be tested, and a new test summary corresponding to the function can be generated and stored.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for incremental compositional dynamic test generation will be presented.

Referring now to FIG. 1, aspects of one operating environment 100 for the various embodiments presented herein will be described. The operating environment 100 shown in FIG. 1 includes a data storage device 102. According to various embodiments, the data storage device 102 described herein may include, but is not limited to, one or more computer-readable storage media (as defined herein), server computers, desktop computers, mobile telephones, laptop computers, other computing systems, and the like. In the illustrated embodiment, the data storage device 102 is a server computer configured to operate on or in communication with a network 104. It should be understood that this embodiment is exemplary.

The data storage device 102 stores or hosts code 106. The code 106 can include computer-executable instructions corresponding to one or more programs, applications, modules, program suites or packages, other software, and the like. In some embodiments, for example, the code 106 includes computer-executable instructions of software applications such as operating systems, image parsers, audio and/or video codecs, media playback applications, word processing applications, and the like. The code 106 may be, or may be included as part of, a software suite or application such as WINDOWS from MICROSOFT CORPORATION of Redmond, Wash. It should be understood that in the description herein, the code 106 may correspond to a portion of procedures, functions, and/or instructions taken from an application or software package and/or may correspond to all procedures, functions, and/or instructions of an application or software package.

The operating environment 100 also includes a test engine 108 operating on or in communication with the network 104 and/or the data storage device 102. The test engine 108 is configured to execute an operating system (not illustrated) and one or more application programs such as, for example, a function parser 110, a test application 112, and/or other application programs. The operating system is a computer program for controlling the operation of the test engine 108. The application programs are executable programs configured to execute on top of the operating system to provide the functionality described herein. Although the function parser 110 and the test application 112 are illustrated as components of the test engine 108, it should be understood that both of these components, or combinations thereof, may be embodied as or in stand-alone devices or components thereof operating on or in communication with the network 104 and/or the test engine 108.

The function parser 110 is configured to receive the code 106, or portions thereof, to identify functions in the code 106, and to extract the functions from the code 106 for analysis by the test application 112. As used herein, a "function" refers to an instruction, a procedure, and/or blocks of instructions or procedures. As mentioned above, the code 106 may correspond to an application or program and may include many functions, some, all, or none of which may be analyzed by the test application 112. For example, some programs such as members of the WINDOWS family of operating systems from MICROSOFT CORPORATION may include millions or even billions of functions, some, all, or none of which may be analyzed by the test application 112, if desired. The functions identified in the code 106 may be parsed from the code 106 and tested one or more at a time, if desired, to provide unit testing of the code 106. In some embodiments, all functions of the code 106 are tested at one time to provide whole-program testing of the code 106.

In some embodiments, the test application 112 is configured to track test inputs generated while testing a version of the code 106. The test inputs and/or a description thereof are saved as test summaries 114, which may be stored at a data storage location such as a summary repository 116. The summary repository 116 may include one or more databases, servers, computer-readable storage media, combinations thereof, and the like. The test summaries 114 may be reused during subsequent tests of the code 106, or versions thereof, as will be explained in more detail herein.

In some embodiments, the code 106 is updated. For example, the code 106 may be updated when a new version of a program is released, when a security patch or update for the code 106 is released, and/or when a new version of the code 106 is developed or made available for other reasons. According to various embodiments disclosed herein, the test application 112 is configured to analyze a new version of the code 106 to identify security vulnerabilities in the new version of the code 106. In some embodiments, the test application 112 simply tests the new version of the code 106 using constraint solving and symbolic execution, as explained above, to identify security vulnerabilities. During testing of the new version of the code 106, the test application 112 may ignore testing of any previous versions of the code 106.

In some embodiments, the test application 112 is configured to recognize that the received code 106 corresponds to a new version of code 106, wherein the previous version of the code previously was tested by the test engine 108 and/or another testing device. The recognition that the code 106 corresponds to a new version of previously tested code 106 may be made based upon file names, structure of the code 106, user input, and/or other considerations.

Upon recognizing that the code 106 corresponds to a new version of code 106 that previously was tested, the test application 112 is configured to determine if one or more test summaries 114 generated during testing of a previous version of the code 106 are reusable during testing of the new version of the code 106. If the test summaries 114 are reusable during testing of the new version of the code 106, the test application 112 relies upon the existing test summaries 114 to test the new version of the code 106. By using pre-existing test summaries 114, the test application is relieved from symbolically executing all of the code 106 and/or identifying and solving constraints of the code 106. Thus, in some embodiments the test application can increase the rate of the testing and/or reduce the computational cost of the testing.

In some embodiments, as will be described in more detail with reference to FIGS. 2-5, the test application 112 generates a function call graph corresponding to the code 106. It should be understood that the generation of the function call graph may be conceptual, and need not be generated in a tangible or viewable form. The test application 112 analyzes the function call graph to determine functions in the code 106 that have been modified and/or that generate a function call directed to a function that has been modified since the previous version of the code was tested and the test summaries 114 generated. Additionally, or alternatively, the test application 112 can analyze the function call graph to identify functions that have not been modified and/or that do not generate a function call directed to a function that has been modified since the previous version of the code 106 was tested and the test summaries 114 generated.

Test summaries 114 corresponding to functions that have not been modified since the test summaries were generated 114, and/or that do not generate a function call directed to a function that has been modified since the test summaries 114 were generated, may be reused during testing of the new version of the code 106. Test summaries 114 corresponding to functions that have been modified and/or that generate one or more function calls to functions that have been modified since the test summaries 114 were generated, may be marked as potentially invalid.

In some embodiments, the test application 112 disregards test summaries 114 marked as potentially invalid, and merely retests the functions corresponding to the disregarded test summaries 114 during testing of the new version of the code 106. In some embodiments, the test application 112 is configured to further analyze the potentially invalid test summaries 114 identified in the first phase of the analysis using a second phase of analysis, as described in more detail below with reference to FIG. 5.

During the second phase of the analysis, the test application 112 transforms the behavior of the modified functions and/or functions calling modified functions of the code 106 into a logic formula that represents the behavior of the function. Additionally, the test application 112 transforms the earlier version of the function into a logic formula, and the logic formulae for the new version of the function and the old version of the function are compared to determine if the behavior of the functions has actually been modified by the changes to the code 106.

If the modified function has a behavior that is logically equivalent to the previous version of the function, the test summary 114 corresponding to the function is valid, and may be used in the testing of the new version of the code 106, at least with respect to the function in question. If the modified function has a behavior that is not logically equivalent to the previous version of the function, the test summary 114 corresponding to the function is invalid, and the test summary 114 may not be used during testing of the new version of the code 106. As mentioned above with regard to the first phase of the analysis, the test application 112 can disregard test summaries 114 determined to be invalid, and can retest the functions corresponding to the disregarded test summaries 114 during testing of the new version of the code 106. It should be understood that more than one test summary 114 may relate to a particular function. Thus, more than one test summary 114 may be validated/invalidated at any time during testing.

FIG. 1 illustrates one data storage device 102, one network 104, one test engine 108, and one summary repository 116. It should be understood, however, that some implementations of the operating environment 100 include multiple data storage devices 102, multiple networks 104, multiple test engines 108, and multiple summary repositories 116. Therefore, the illustrated embodiment should be understood as being exemplary, and should not be construed as being limiting in any way.

Figure 2:
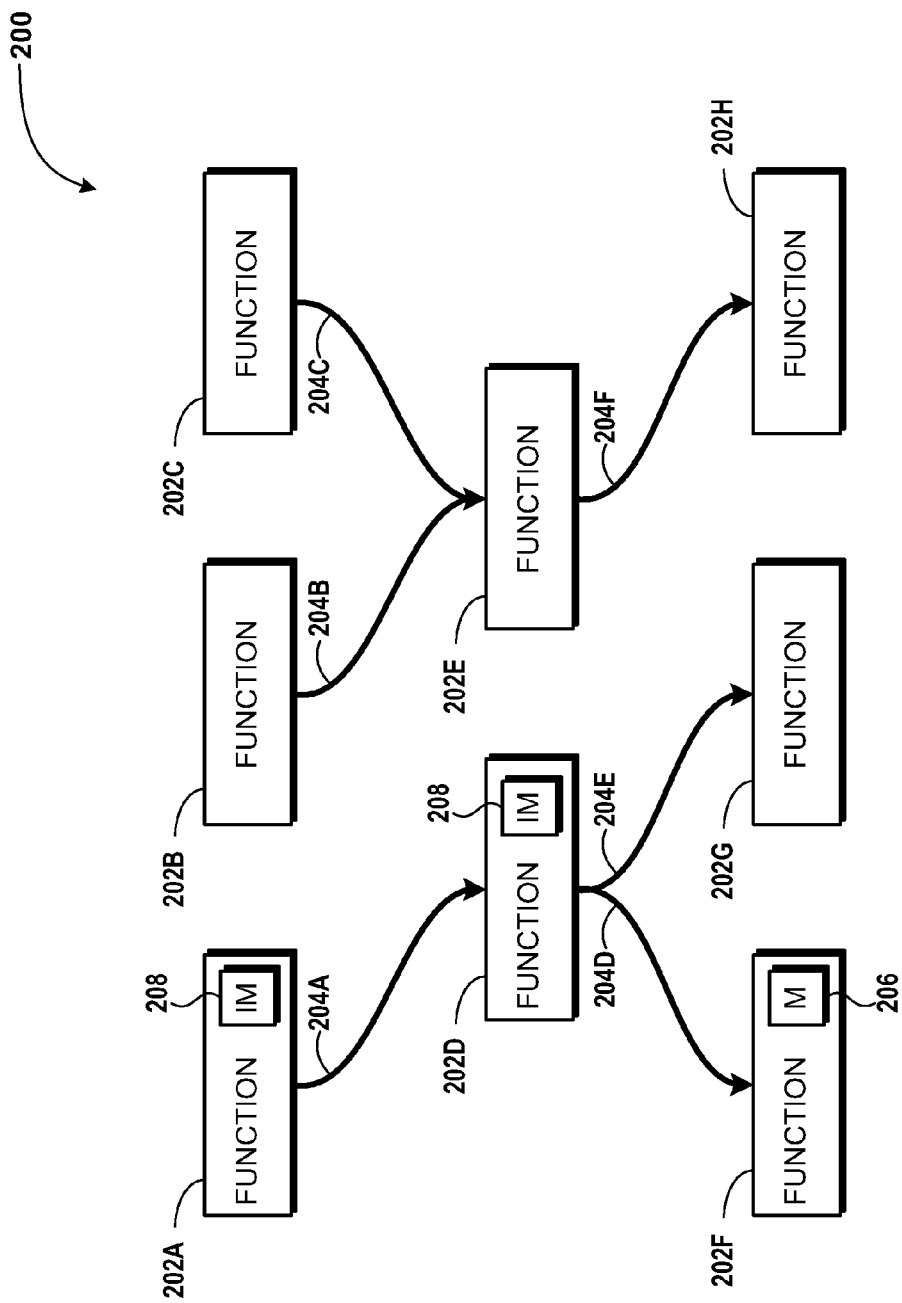
FIG. 2 is a block diagram schematically illustrating a modified function call diagram of tested code, according to an exemplary embodiment.

Turning now to FIG. 2, additional aspects of incremental compositional dynamic test generation are described. In particular, FIG. 2 is a block diagram schematically illustrating a modified function call diagram 200 reflecting differences between versions of tested code 106, according to an exemplary embodiment. In the illustrated modified function call diagram 200, program functions 202A-H are shown (hereinafter referred to as "functions 202"). Execution paths 204A-F are shown (hereinafter referred to as "execution paths 204"). The execution paths 204 illustrate function calls made during execution the code 106. For example, the function 202A can call the function 202D, as illustrated by the execution path 204A. This example is illustrative, and should not be construed as being limiting in any way.

As shown in the illustrated embodiment, the function 202F has been modified in the new version of the code 106, as indicated by the modification indication 206 ("M"). The function 202F is the only function 202 illustrated in FIG. 2 that has been modified. Additionally, the functions 202A and 202D indirectly call the modified function 202F, as can be seen by the execution paths 204A and 204D. Thus, the functions 202A and 202D include an indirect modification indication 208 ("IM"), indicating that the functions 202A and 202D can generate calls for the function 202F, which has been modified in the new version of the code 106.

As discussed above with reference to FIG. 1, the test engine 108 is configured to test code 106, and to generate test summaries 114 for the code 106. Additionally, the test engine 108 is configured to analyze new versions of the code to identify differences between the new versions of the code 106 and a previous version of the code 106. If functions 202 of a new version of the code 106 are modified after the previous version of the code 106 is tested, the test engine 108 may mark as potentially invalid any test summaries 114 that correspond to the modified functions 202. Similarly, the test engine 108 may mark as potentially invalid any test summaries 114 that correspond to functions 202 of the new version of the code 106 that generate one or more function calls to the modified functions 202. The functions 202 that have been modified, as well as functions 202 that generate function calls to modified functions 202, may be analyzed further to determine if the test summaries 114 corresponding thereto may be reused, as will be explained in more detail below with reference to FIGS. 2-5.

It should be appreciated that the functions 202B, 202C, 202E, and 202H have not been modified since the previous version of the code 106 was tested and the test summaries 114 generated. Similarly, the functions 202B, 202C, 202E, and 202H do not generate function calls to any functions 202 that have been modified since the previous version of the code 106 was tested and the test summaries 114 generated. Thus, the test application 112 marks as valid the test summaries 114 that correspond to the functions 202B, 202C, 202E, and 202H. The word "marks," as used herein and in the claims, refers to denoting in some manner a property of the functions 202. The "marking" may be achieved by way of associating a valid or invalid flag with identification of the associated function 202 and/or test summary 114, storing the functions 202 in valid and/or invalid data storage locations, combinations thereof, and the like. The test summaries 114 marked as valid may be reused during testing of the new version of the code 106.

Figure 3:
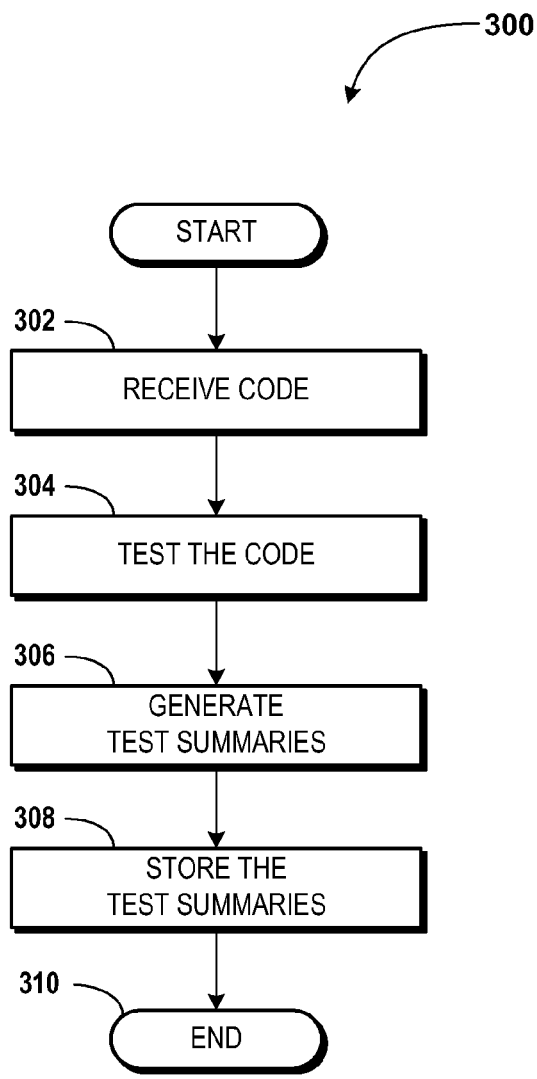
FIG. 3 is a flow diagram showing aspects of a method for generating test summaries used to provide incremental compositional dynamic testing of code, according to an exemplary embodiment.

Turning now to FIG. 3, aspects of a method 300 for generating test summaries 114 used to provide incremental compositional dynamic testing of code 106 will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined above. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the test engine 108. It should be understood that these embodiments are exemplary, and should not be viewed as being limiting in any way. The method 300 begins at operation 302, wherein the test engine 108 receives the code 106. As explained above, the code 106 can include almost any computer-executable instructions including, but not limited to, a software application, a software suite or package, a program module, an application, portions and/or combinations thereof, and the like. For purposes of more clearly describing the concepts and technologies disclosed herein, the code 106 is described as corresponding to a software application such as a member of the WINDOWS family of operating systems from MICROSOFT CORPORATION of Redmond, Wash. It should be understood that this embodiment is exemplary, and should not be construed as being limiting in any way.

From operation 302, the method 300 proceeds to operation 304, wherein the test engine 108 dynamically tests the code 106. This dynamic testing can include what is referred to as "whitebox fuzzing." Thus, during the dynamic testing of the code 106, the test engine 108 can execute the code 106 while simultaneously executing the program symbolically to gather constraints on inputs from conditional statements encountered during the execution. The gathered constraints are systematically negated and solved using constraint solving functionality provided by the test application 108 and/or a whitebox fuzzing application in communication therewith (not illustrated). By solving the constraints, the test engine 108 generates new test inputs to exercise various execution paths of the code 106.

From operation 304, the method 300 proceeds to operation 306, wherein the test inputs, corresponding to the symbolic execution paths and sub-paths identified in operation 304, can be used to generate test summaries 114. From operation 306, the method 300 proceeds to operation 308, wherein the test summaries 114 are stored at a data storage location such as, for example, the summary repository 116. As will be explained in more detail below with reference to FIGS. 4-5, the test summaries 114 can be reused to test the code 106, or a later iteration or version thereof, without reevaluating the code 106 using the dynamic test generation steps described above. The test summaries 114 may be used by the test engine 108 to increase the speed of the analysis provided by the test engine 108, to reduce computational and/or time cost associated with the analysis, and/or to avoid recalculation of the identified test inputs.

It should be appreciated that the test summaries 114 can be updated, replaced, removed, supplemented, and/or otherwise modified at any time. It also should be appreciated that the summary repository 116 may store any number of test summaries 114. Over time, the test engine 108 may generate a large data set of test summaries 114 during testing of code 106. Some, all, or none of these test summaries 114 may be stored in the summary repository 116, if desired. The method 300 ends at operation 310.

Figure 4:
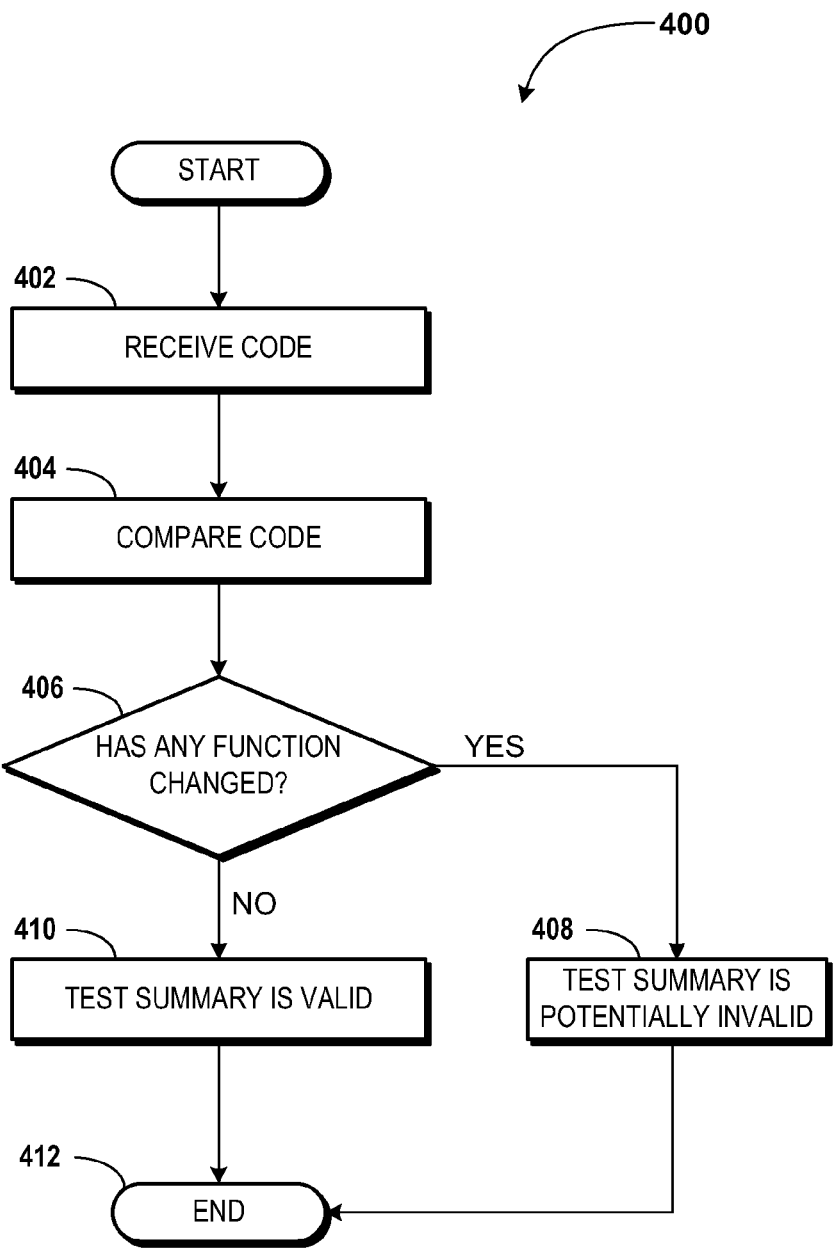
FIG. 4 is a flow diagram showing aspects of a method for testing code, according to an exemplary embodiment.

Turning now to FIG. 4, aspects of a method 400 for incrementally testing the code 106 will be described in detail. The method 400 begins at operation 402, wherein the test engine 108 receives the code 106. As explained above with reference to operation 302 of the method 300, the code 106 can be a portion of a software application or program, or an entire software application or program. In some embodiments, the code 106 received in operation 402 is a new version of the software application or program received in operation 302 of FIG. 3. In other embodiments, the code 106 received in operation 402 can be a patch or update for the code 106 received in operation 302 of FIG. 3. For purposes of describing the concepts and technologies disclosed herein, the code 106 received in operation 402 will be described as being a new version of the code 106 received in operation 302 of FIG. 302. In the exemplary new version of the code 106, function names have not been modified, to simplify the description. It should be understood that these embodiments are exemplary.

From operation 402, the method 400 proceeds to operation 404, wherein the test engine 108 compares the new version of the code 106 to a previous version of the code 106. For example, if the code 106 received in operation 402 corresponds to version 2 of a software program, a previous version of the code 106 may include version 1 of the software program. These examples should be understood to be illustrative, and should not be construed as being limiting in any way. The test engine 108 may compare the versions of the code 106 to identify all instructions of the new version of the code 106 that have been modified since the previous version of the code 106 was tested. As discussed above with reference to FIG. 2, the test application 112 can generate a function call graph, and analyze the function call graph to identify modified functions and calls to modified functions by other functions. Also as mentioned above, calculation and analysis of the function call graph can be completed conceptually, without actually generating a tangible or viewable graph.

From operation 404, the method 400 proceeds to operation 406, wherein the test engine 108 determines if any of the functions 202 of the new version of the code 106 have changed since one or more of the test summaries 114 were generated for a previous version of the code 106. If a function 202 has been modified, or if a function 202 generates a call to a modified function 202, the test engine 108 marks one or more test summaries 114 corresponding to the functions 202 as potentially invalid, as illustrated at operation 408. Although not illustrated in FIG. 4, the test engine 108 can be configured to generate alerts, alarms, and/or other output for a user or device in response to determining that the one or more test summaries 114 are potentially invalid. For test summaries 114 marked as potentially invalid, the method 400 ends after operation 408, and the test engine 108 may provide the functionality described below with reference to FIG. 5.

Returning to operation 406, if no functions 202 of the code 106 have been modified, and if no functions 202 of the code 106 generate a call to a modified function 202, the method 400 proceeds to operation 410. In operation 410, the test summaries 114 are marked as valid. As mentioned above, test summaries 114 that are determined by the test engine 108 to be valid may be used to test the new version of the code 106. Although not illustrated, the test engine 108 can be configured to generate alerts, alarms, and/or other output for a user or device in response to determining that the one or more test summaries 114 are valid. The method 400 ends at operation 412.

Figure 5:
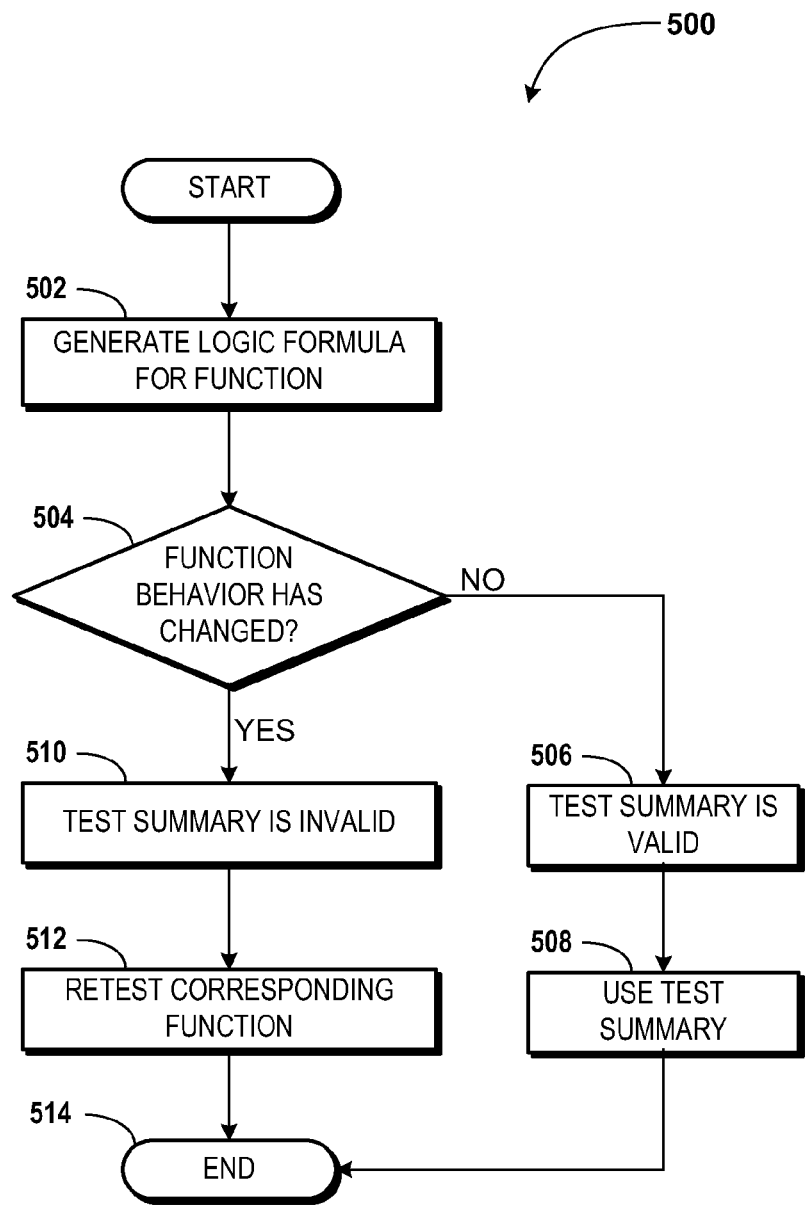
FIG. 5 is a flow diagram showing aspects of a method for validating potentially invalid test summaries, according to an exemplary embodiment.

Turning now to FIG. 5, aspects of a method 500 for validating potentially invalid test summaries 114 will be described in detail. As explained above with reference to FIG. 4, a potentially invalid test summary 114 corresponds to a function 202 of the tested code 106. Furthermore, as explained above, the function 202 corresponding to the one or more potentially invalid test summaries 114 exists in a new version of the code 106, as well as a previous version of the code 106 tested by the test engine 108 or another testing device. The potentially invalid test summary 114, the new version of the code 106 corresponding to the potentially invalid test summary 114, and a previous version of the code 106 corresponding to the potentially invalid test summary 114 may be stored at a data storage device such as, for example, the data storage device 102 and/or the summary repository 116.

The method 500 begins at operation 502, wherein the test engine 108 generates a logic formula for the function 202 corresponding to the potentially invalid test summary 114. In particular, the test engine 108 transforms the code of the function 202 into a logic formula that represents the behavior of the function 202. It should be noted that according to some embodiments, the logic formula approximates or abstracts the behavior of the function 202, and does not necessarily represent the function with perfect precision. Some details of the function 202 are ignored or disregarded, and the test application does not necessarily solve all constraints of the function 202. Additionally, it should be noted that the generated logic formula, as well as the potentially invalid test summary 114 may relate to only a portion of the function 202, and not necessarily the entire function 202.

From operation 502, the method 500 proceeds to operation 504, wherein the test engine 108 determines if the behavior of the function 202 has changed, with respect to the behavior of the function 202 as reflected by the potentially invalid test summary 114. During this comparison, the test engine 108 is configured to compare the behavior of the function 202 and the potentially invalid test summary 114 between execution points, denoted herein as an entry point lp and an exit point lq. Furthermore, at the entry point lp a program condition P exists, and at the exit point lq, a program condition Q exists. Generally speaking, the behavior of the function 202 and the potentially invalid test summary 114 can be determined to be equivalent if for every state that satisfies P at the point lp of the potentially invalid test summary 114, there exists an execution that visits the point lq and satisfies Q.

It will be appreciated, that even if multiple changes have been made to the function 202, the logical behavior of the function 202 may be unchanged from a previous version of the function 202. In such cases, therefore, the usefulness of the potentially invalid test summary 114 may be preserved across modifications to the function 202. For example, assume that a previous version of the function 202 included a statement "If x=0 & x>0, then . . . " Meanwhile, assume that in a new version of the function 202, this statement was replaced with "If x>0, then . . . " In this simple example, the statements of the two versions of the function 202 may be determined to be logically equivalent between two particular points. Therefore, a test summary 114 corresponding to the function 202 may be used during analysis of the new version of the code 106. It should be understood that this example is merely illustrative, and should not be construed as being limiting in any way.

If the test application 108 determines that the behavior of the function 202 has not changed, then the test application 108 determines that the test summary 114 corresponding to the function 202 is valid, as illustrated in operation 506. From operation 506, the method 500 proceeds to operation 508, wherein the test application 108 retrieves the test summary 114 and uses the retrieved test summary 114 for testing of the new version of the code 106.

If the test application 108 determines in operation 504 that the behavior of the function 202 has changed, the test application 108 determines that the test summary 114 corresponding to the function 202 is invalid, as illustrated at operation 510. From operation 510, the method 500 proceeds to operation 512, wherein the test application 112 can retest the code 106 and/or the function 202 corresponding to the invalid test summary 114. After the new function 202 is tested, a new test summary 114 may be computed and stored as the test summary 114, if desired. The method 500 ends at operation 514.

Figure 6:
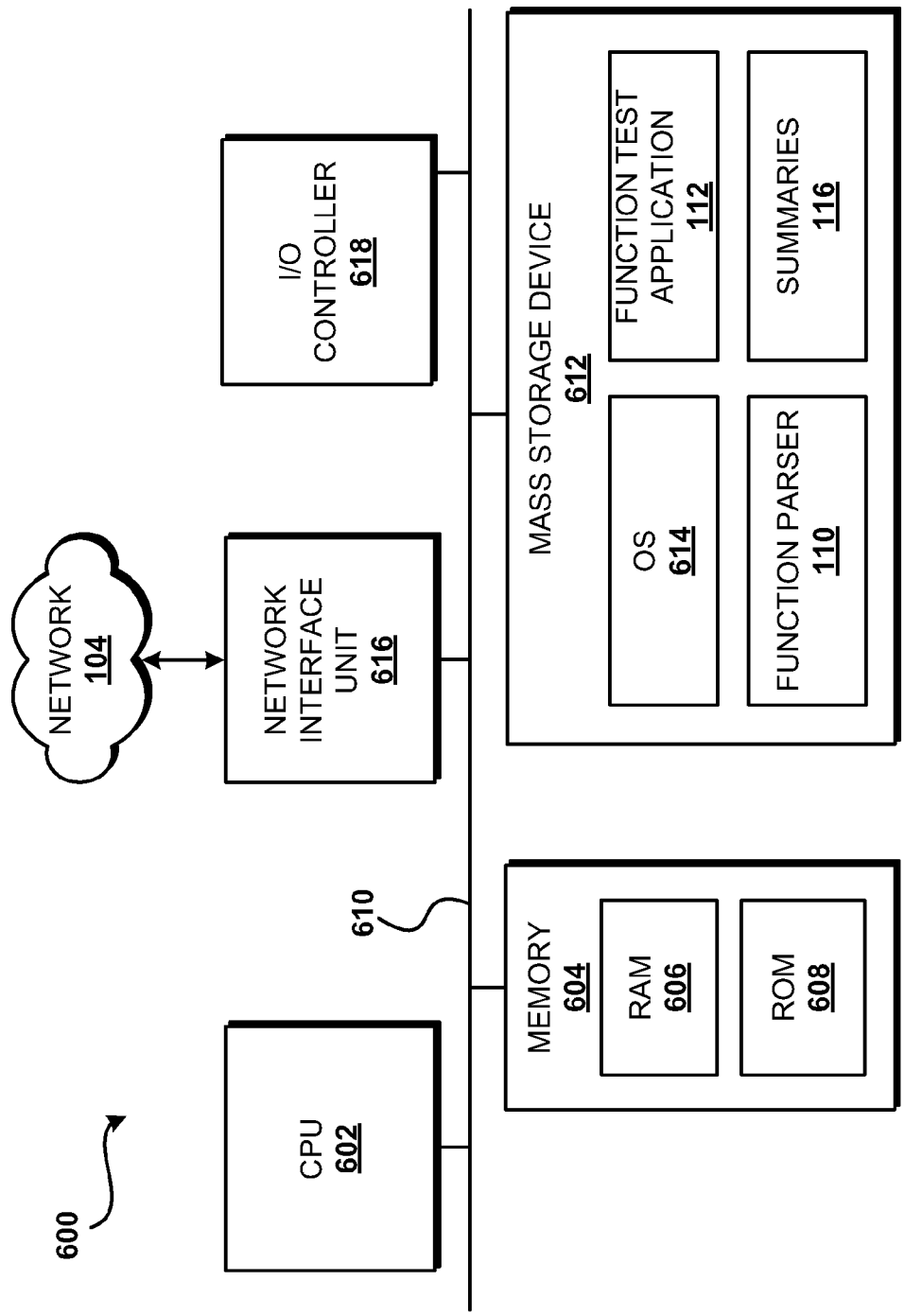
FIG. 6 is a computer architecture diagram illustrating an exemplary computer hardware and software architecture for a computing system capable of implementing aspects of the embodiments presented herein.

FIG. 6 illustrates an exemplary computer architecture 600 for a device capable of executing the software components described herein for incremental compositional dynamic test generation. Thus, the computer architecture 600 illustrated in FIG. 6 illustrates an architecture for a server computer, mobile phone, a PDA, a smart phone, a server computer, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing the operating system 614, the function parser 110, and the test application 112. The mass storage device 612 also can be configured to store the code 106 and the test summaries 114.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a hard disk or CD-ROM drive, it should be appreciated by those skilled in the art that computer-readable media can be any available computer storage media that can be accessed by the computer architecture 600.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of this specification and the claims, the phrase "computer-readable storage medium" and variations thereof, does not include waves, signals, and/or other transitory and/or intangible communication media.

According to various embodiments, the computer architecture 600 may operate in a networked environment using logical connections to remote computers through a network such as the network 104. The computer architecture 600 may connect to the network 104 through a network interface unit 616 connected to the bus 610. It should be appreciated that the network interface unit 616 also may be utilized to connect to other types of networks and remote computer systems, for example, the data storage device 102. The computer architecture 600 also may include an input/output controller 618 for receiving and processing input from a number of other devices, including a keyboard, mouse, or electronic stylus (not shown in FIG. 6). Similarly, the input/output controller 618 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art.

It is also contemplated that the computer architecture 600 may not include all of the components shown in FIG. 6, may include other components that are not explicitly shown in FIG. 6, or may utilize an architecture completely different than that shown in FIG. 6.

Based on the foregoing, it should be appreciated that technologies for incremental compositional dynamic test generation have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for testing code, the computer-implemented method comprising performing computer-implemented operations for:
   receiving, at a test engine executing a test application, a new version of the code, the new version of the code comprising a new version of one or more functions;
   retrieving, by the test engine, an old version of the code from a data storage location, the old version of the code comprising an old version of the one or more functions;
   comparing, by the test engine, the new version of the code to the old version of the code to determine if the new version of the one or more functions has been modified with respect to the old version of the one or more functions;
   retrieving, by the test engine, a test summary corresponding to the old version of the one or more functions;
   in response to determining that the old version of the one or more functions has been modified, treating, by the test engine, the test summary as potentially invalid;
   generating a logic formula corresponding to the new version of the one or more functions, the logic formula comprising a logic formula that logically describes the behavior of the new version of the one or more functions; and
   comparing the test summary deemed to be potentially invalid to the logic formula to determine if the test summary deemed to be potentially invalid holds true for the logic formula along all execution paths.

2. The method of claim 1, further comprising using the test summary to test the new version of the one or more functions when the new version of the code is tested, in response to determining that the old version of the one or more functions has not been modified.

3. The method of claim 1, wherein the new version of the one or more functions is determined to have been modified if the new version of the one or more functions generates at least one call to a modified function.

4. The method of claim 1, further comprising:
   treating the test summary as valid, in response to determining that the test summary deemed to be potentially invalid holds true for the logic formula along all execution paths; and
   treating the test summary as invalid, in response to determining that the test summary deemed to be potentially invalid does not hold true along all execution paths.

5. The method of claim 4, further comprising using the test summary to test the new version of the one or more functions when the new version of the code is tested, in response to determining that the test summary is valid.

6. The method of claim 1, wherein the test summary comprises a summary of test inputs determined during testing of the old version of the code.

7. The method of claim 1, wherein the new version of the one or more functions is determined to have been modified if the new version of the one or more functions is not identical to the old version of the one or more functions.

8. A computer-implemented method for testing code, the computer-implemented method comprising performing computer-implemented operations for:
   receiving, at a test engine executing a test application, new version of the code, the new version of the code comprising a new version of one or more functions;
   retrieving, by the test engine, an old version of the code from a data storage location, the old version of the code comprising an old version of the one or more functions;
   comparing, by the test engine, the new version of the code to the old version of the code to determine if the new version of the one or more functions has been modified with respect to the old version of the one or more functions in the old version of the code;
   retrieving, by the test engine, at least one test summary associated with the old version of the one or more functions;
   if the new version of the one or more functions is not determined to have been modified, using, by the test engine, the retrieved test summary to test the one or more functions when the new version of the code is tested;
   if the new version of the one or more functions is determined to have been modified, treating, by the test engine, the retrieved test summary as potentially invalid;
   generating a logic formula corresponding to the new version of the one or more functions, the logic formula comprising a logic formula that logically describes the behavior of the new version of the one or more functions; and
   comparing the test summary deemed to be potentially invalid to the logic formula to determine if the test summary deemed to be potentially invalid holds true for the logic formula for all execution paths between two points of the function.

9. The method of claim 8, wherein the new version of the one or more functions is determined to have been modified if the new version of the one or more functions generates at least one call to a function that calls a modified function.

10. The method of claim 8, further comprising:
   treating a test summary corresponding to the function in the old version of the code as valid, in response to determining that the test summary deemed to be potentially invalid holds true for the logic formula along all execution paths between the two points of the function; and
   treating the test summary as invalid, in response to determining that the test summary deemed to be potentially invalid does not hold true for the logic formula along all execution paths between the two points of the function.

11. The method of claim 10, further comprising:
   discarding the test summary in response to treating the test summary as invalid; testing the new version of the code;
   generating a new version of the test summary while testing the new version of the code; and storing the new version of the test summary in the data storage device.

12. A computer-readable storage medium having computer readable instructions stored thereupon that, when executed by a computer, cause the computer to:
receive a new version of the code, the new version of the code comprising a new version of one or more functions corresponding to an application;
retrieve an old version of the code from a data storage location, the old version of the code comprising an old version of the one or more functions;
compare the new version of the code to the old version of the code to determine if the new version of the one or more functions has been modified with respect to the old version of the one or more functions in the old version of the code;
retrieve at least one test summary associated with the old version of the one or more functions;
treat the test summary as potentially invalid in response to determining that the old version of the one or more functions has been modified;
generate a logic formula corresponding to the new version of the one or more functions, the logic formula comprising a logic formula that logically describes the behavior of the new version of the one or more functions; and
compare the test summary deemed to be potentially invalid to the logic formula to determine if the test summary deemed to be potentially invalid holds true for the logic formula along all execution paths.

* * * * *